US012671763B2

(12) United States Patent
Sutar et al.

(10) Patent No.: US 12,671,763 B2
(45) Date of Patent: Jun. 30, 2026

(54) SYSTEM AND METHOD FOR PROVIDING AN IDENTICAL RESPONSE TO A SIMILAR ISSUE THAT IS RECEIVED FROM DIFFERENT CUSTOMERS, VIA INBOUND-INTERACTION IN A DIGITAL MULTI-CHANNEL CONTACT CENTER

(71) Applicant: NICE LTD., Ra'anana (IL)

(72) Inventors: Vikiran Sutar, Pune (IN); Shubham Dwivedi, Indore (IN); Omkar Joglekar, Pune (IN); Aseem Gupta, Pune (IN)

(73) Assignee: NICE, LTD., Ra'anana (IL)

( * ) Notice: Subject to any disclaimer, the term of this patent is extended or adjusted under 35 U.S.C. 154(b) by 141 days.

(21) Appl. No.: 18/384,858

(22) Filed: Oct. 29, 2023

(65) Prior Publication Data

US 2025/0141996 A1     May 1, 2025

(51) Int. Cl.
H04M 3/523     (2006.01)
G06F 40/279     (2020.01)
H04M 3/38     (2006.01)

(52) U.S. Cl.
CPC ........ H04M 3/5232 (2013.01); G06F 40/279 (2020.01); H04M 3/387 (2013.01)

(58) Field of Classification Search
CPC ............................ H04M 3/5232; G06F 16/33
USPC .................................................... 379/265.05
See application file for complete search history.

(56) References Cited

U.S. PATENT DOCUMENTS

| | | | | |
|---|---|---|---|---|
| 9,953,088 | B2 * | 4/2018 | Gruber | G06F 16/9535 |
| 10,692,006 | B1 * | 6/2020 | Zhang | G06N 3/08 |
| 11,676,044 | B1 * | 6/2023 | Mazza | G06N 5/043 |
| | | | | 706/11 |
| 2013/0282603 | A1 * | 10/2013 | Gaedcke | G06Q 30/0207 |
| | | | | 705/319 |
| 2015/0154956 | A1 * | 6/2015 | Brown | G06F 16/353 |
| | | | | 704/235 |

* cited by examiner

*Primary Examiner* — Ahmad F. Matar
(74) *Attorney, Agent, or Firm* — SOROKER NORDMAN RIBA

(57)     ABSTRACT

A computer-implemented method for providing an identical response to a similar issue that is received from different customers. The computer-implemented method includes when a contact-center occupancy-rate is above a first-preconfigured-threshold, for each inbound-interaction from a customer that is entering an interactions-queue: (i) creating a temporary-case for an issue raised in the inbound-interaction; (ii) operating a Similarity Detection Module on the created temporary-case and cases in a cases-queue to receive a similarity-score for the created temporary-case; (iii) when the received similarity-score is above a second-preconfigured-threshold, operating a category Qualifier Module on the temporary-case to provide an indication as to qualification of a category of the issue raised; (iv) when the provided indication as to qualification of the category of the issued raised is qualified, merging the temporary-case with cases in the cases-queue and retrieving a response of the cases in the cases-queue; and (v) sending the retrieved response to the customer.

9 Claims, 15 Drawing Sheets

100A raised a new issue
110a

Contact center occupancy rate reached
120a
Temporary-case
130a

Customer interacting via digital channel

Similarity Detection Module (SDM)140a cases-queue
Similarity detection category Qualifier Module (CQM) 150a 155a 160a
database of categories 170a Agent handling the case

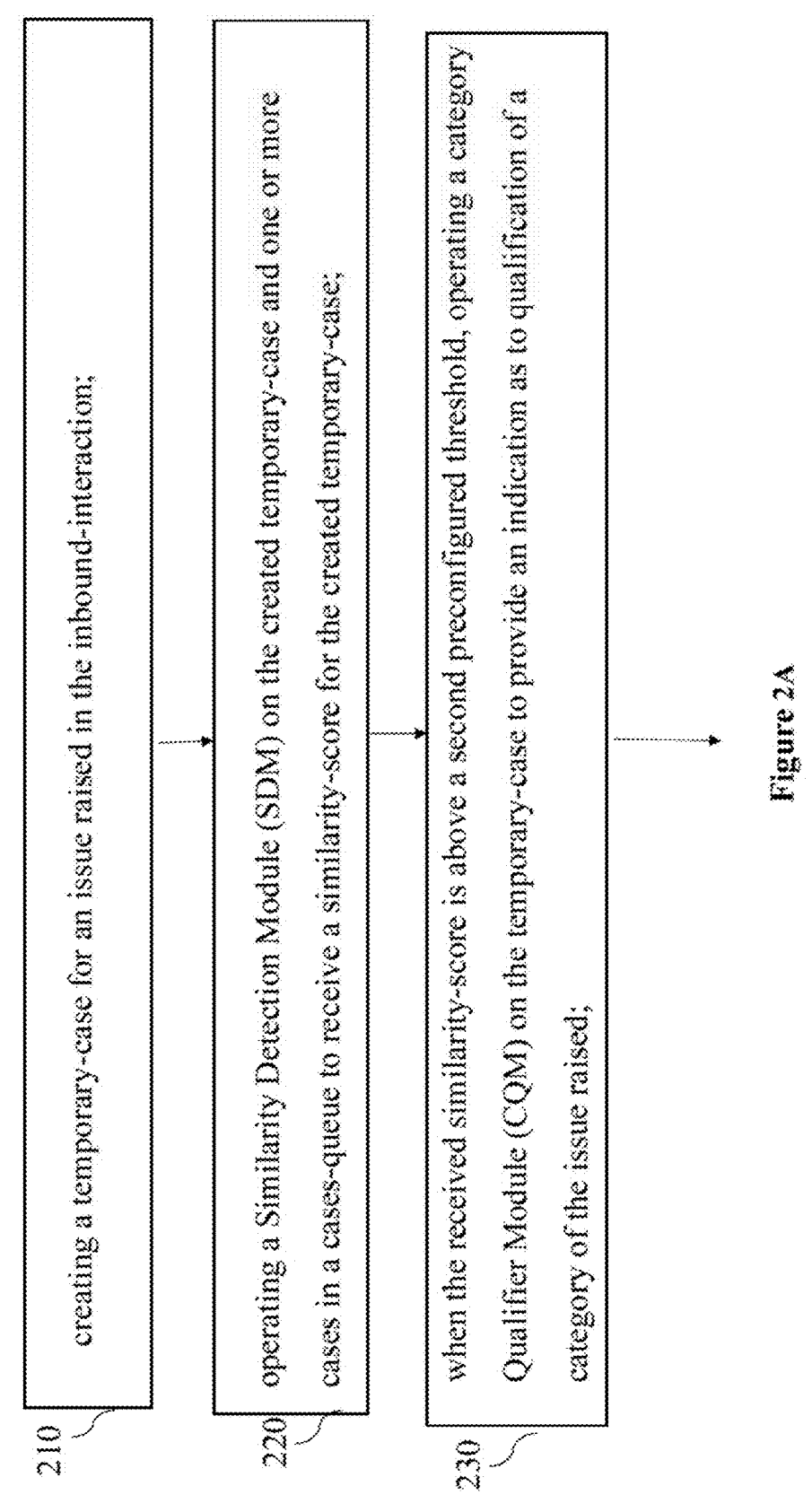

210 creating a temporary-case for an issue raised in the inbound-interaction;

220 operating a Similarity Detection Module (SDM) on the created temporary-case and one or more cases in a cases-queue to receive a similarity-score for the created temporary-case;

230 when the received similarity-score is above a second preconfigured threshold, operating a category Qualifier Module (CQM) on the temporary-case to provide an indication as to qualification of a category of the issue raised;

200

Figure 2A 240 when the provided indication as to qualification of the category of the issued raised is qualified, merging the temporary-case with one or more cases in the cases-queue and retrieving a response of the one or more cases in the cases-queue;

250 sending the retrieved response to the customer.

| Inputs | Query 1 | Query 2 | Query 3 | Query 4 | Query 5 | Query 6 | Query 7 | Query 8 | Query 9 | Query 10 | Query 11 |
|---|---|---|---|---|---|---|---|---|---|---|---|
| $X_{total}$ | 10000 | 10000 | 10000 | 10000 | 10000 | 10000 | 10000 | 10000 | 10000 | 10000 | 10000 |
| $C_n$ | 5 | 10 | 15 | 20 | 25 | 30 | 35 | 40 | 45 | 50 | 200 |
| $PC_{before} = X_{total} - A$ | 9900 | 9900 | 9900 | 9900 | 9900 | 9900 | 9900 | 9900 | 9900 | 9900 | 9900 |
| $PC_{after} = X_{total}(1 - S_y/100) - A + C_n$ | 1905 | 1910 | 1915 | 1920 | 1925 | 1930 | 1935 | 1940 | 1945 | 1950 | 2100 |

| Inputs | Query 1 | Query 2 | Query 3 | Query 4 | Query 5 | Query 6 | Query 7 | Query 8 |
|---|---|---|---|---|---|---|---|---|
| $X_{total}$ | 500 | 1000 | 1500 | 2000 | 3000 | 5000 | 8000 | 10000 |
| $C_n$ | 5 | 5 | 5 | 5 | 5 | 5 | 5 | 5 |
| $PC_{before} = X_{total} - A$ | 400 | 900 | 1400 | 1900 | 2900 | 4900 | 7900 | 9900 |
| $PC_{after} = X_{total}(1 - S_v/100) - A + C_n$ | 5 | 105 | 205 | 305 | 505 | 905 | 1505 | 1905 |

Figure 5D

SYSTEM AND METHOD FOR PROVIDING AN IDENTICAL RESPONSE TO A SIMILAR ISSUE THAT IS RECEIVED FROM DIFFERENT CUSTOMERS, VIA INBOUND-INTERACTION IN A DIGITAL MULTI-CHANNEL CONTACT CENTER

TECHNICAL FIELD

The present disclosure relates to the field of data analysis for providing an identical response to a similar issue that is received from different customers, via inbound-interaction in a digital multi-channel contact center.

BACKGROUND

Contact centers routinely get multiple requests from different customers for the same issue over different digital channels. In case of a new product launched or a new feature, the contact center may be flooded by customers that are seeking resolution to the same issue. During such times agents get inundated with multiple cases. The average response time during such times may go up to 12 hours and 10 minutes. It also results in duplication of efforts of the agents, coupled with different responses to the same issue depending on the assigned agents.

Current systems in contact centers do not have a mechanism to check if a similar issue in a case is assigned to other agents, and also to consistency resolve the issue. Hence, a high volume of agents may be occupied to resolve the same issue and customers may get different responses to the same issue from different agents that were assigned to the issue. Therefore, the lack of the mechanism to check similar cases in current systems may negatively impact agents productivity, degrade customer experience and the contact center efficiency.

Accordingly, there is a need for a technical solution to detect similar issues in inbound interactions in the contact center and then route the detected issue to the same agent.

There is a need for system and method for providing an identical response to a similar issue that is received from different customers, via inbound-interaction in a digital multi-channel contact center.

SUMMARY

There is thus provided, in accordance with some embodiments of the present disclosure, a computerized-implemented for providing an identical response to a similar issue that is received from different customers, via inbound-interaction in a digital multi-channel contact center.

Furthermore, in accordance with some embodiments of the present disclosure, the computer-implemented method may include when a contact center occupancy rate is above a first preconfigured threshold, for each inbound-interaction from a customer that is entering an interactions-queue: (i) creating a temporary-case for an issue raised in the inbound-interaction; (ii) operating a Similarity Detection Module (SDM) on the created temporary-case and one or more cases in a cases-queue to receive a similarity-score for the created temporary-case; (ii) when the received similarity-score is above a second preconfigured threshold, operating a category Qualifier Module (COM) on the temporary-case to provide an indication as to qualification of a category of the issue raised; (iv) when the provided indication as to qualification of the category of the issued raised is qualified, merging the temporary-case with one or more cases in the cases-queue and retrieving a response of the one or more cases in the cases-queue; and (v) sending the retrieved response to the customer. The response may be presented via a computerized-device of the customer.

Furthermore, in accordance with some embodiments of the present disclosure, for each inbound-interaction from a customer that is entering an interactions-queue and the contact center total occupancy rate is not above the first preconfigured threshold generating a case.

Furthermore, in accordance with some embodiments of the present disclosure, the creating of the temporary-case may include storing information related to the issue raised in the inbound-interaction. The information includes at least one of: (i) customer details; (ii) location; and (iii) time stamp.

Furthermore, in accordance with some embodiments of the present disclosure, the SDM module may include using a Natural Language Processing (NLP) model to calculate the similarity score of the temporary-case by comparing one or more keywords in the issue raised in the inbound-interaction to one or more keywords in an issue raised in each case of the one or more cases stored in the case-queue.

Furthermore, in accordance with some embodiments of the present disclosure, the COM module may include checking if the one or more keywords in the issue raised in the inbound-interaction exist in each category of preconfigured categories stored in a database of categories. When the one or more keywords exist in a category in the database of categories, the issue raised may be indicated as qualified, and when the one or more keywords doesn't exist in any category in the database of categories, the issue raised may be indicated as not-qualified.

Furthermore, in accordance with some embodiments of the present disclosure, when the temporary-case is determined as qualified the computer-implemented method further comprising operating a Supervisor Approval Module (SAM) to enable a user to approve or reject the merging of temporary-case with one or more cases.

Furthermore, in accordance with some embodiments of the present disclosure, after merging the temporary-case with one or more cases in the cases-queue, the computer-implemented method may further include assigning the temporary-case to an agent and sending the retrieved response to the assigned agent.

Furthermore, in accordance with some embodiments of the present disclosure, the retrieved response of the one or more cases in the cases-queue has been entered by a user.

Furthermore, in accordance with some embodiments of the present disclosure, when the received similarity-score is not above a second preconfigured threshold a new-case may be created.

There is further provided, in accordance with some embodiments of the present disclosure, a computerized-system for providing an identical response to a similar issue that is received from different customers, via inbound-interaction in a digital multi-channel contact center Furthermore, in accordance with some embodiments of the present disclosure, the computerized-system may include: one or more processors; a cases-queue; and a memory to store the cases-queue.

Furthermore, in accordance with some embodiments of the present disclosure, when a contact center occupancy rate is above a first preconfigured threshold, for each inbound-interaction from a customer that is entering an interactions-queue the one or more processors may be configured to: (i) create a temporary-case for an issue raised in the inbound-interaction; (ii) operate a Similarity Detection Module (SDM) on the created temporary-case and one or more cases in a cases-queue to receive a similarity-score for the created temporary-case; (iii) when the received similarity-score is above a second preconfigured threshold, operate a category Qualifier Module (COM) on the temporary-case to provide an indication as to qualification of a category of the issue raised; (iv) when the provided indication as to qualification of the category of the issued raised is qualified, merge the temporary-case with one or more cases in the cases-queue and retrieving a response of the one or more cases in the cases-queue; and (v) send the retrieved response to the customer.

BRIEF DESCRIPTION OF THE DRAWINGS

FIGS. 2A-2B are a high-level workflow of a computer-implemented method for providing an identical response to a similar issue that is received from different customers, via inbound-interaction in a digital multi-channel contact center, in accordance with some embodiments of the present disclosure;

FIG. 4 is a table of test simulation, in accordance with some embodiments of the present disclosure;

FIGS. 5A-5F show graph results, in accordance with some embodiments of the present disclosure.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Contact centers routinely get multiple requests from customers for the same issue over different digital channels. During such times agents are swamped with interactions via different digital channels. It also results in duplication of efforts of the agents, coupled with different responses instead of one identical response to the same issue depending on the assigned agents.

Accordingly, there is a need for a technical solution for providing an identical response to a similar issue that is received from different customers, via inbound-interaction in a digital multi-channel contact center.

Figure 1A:
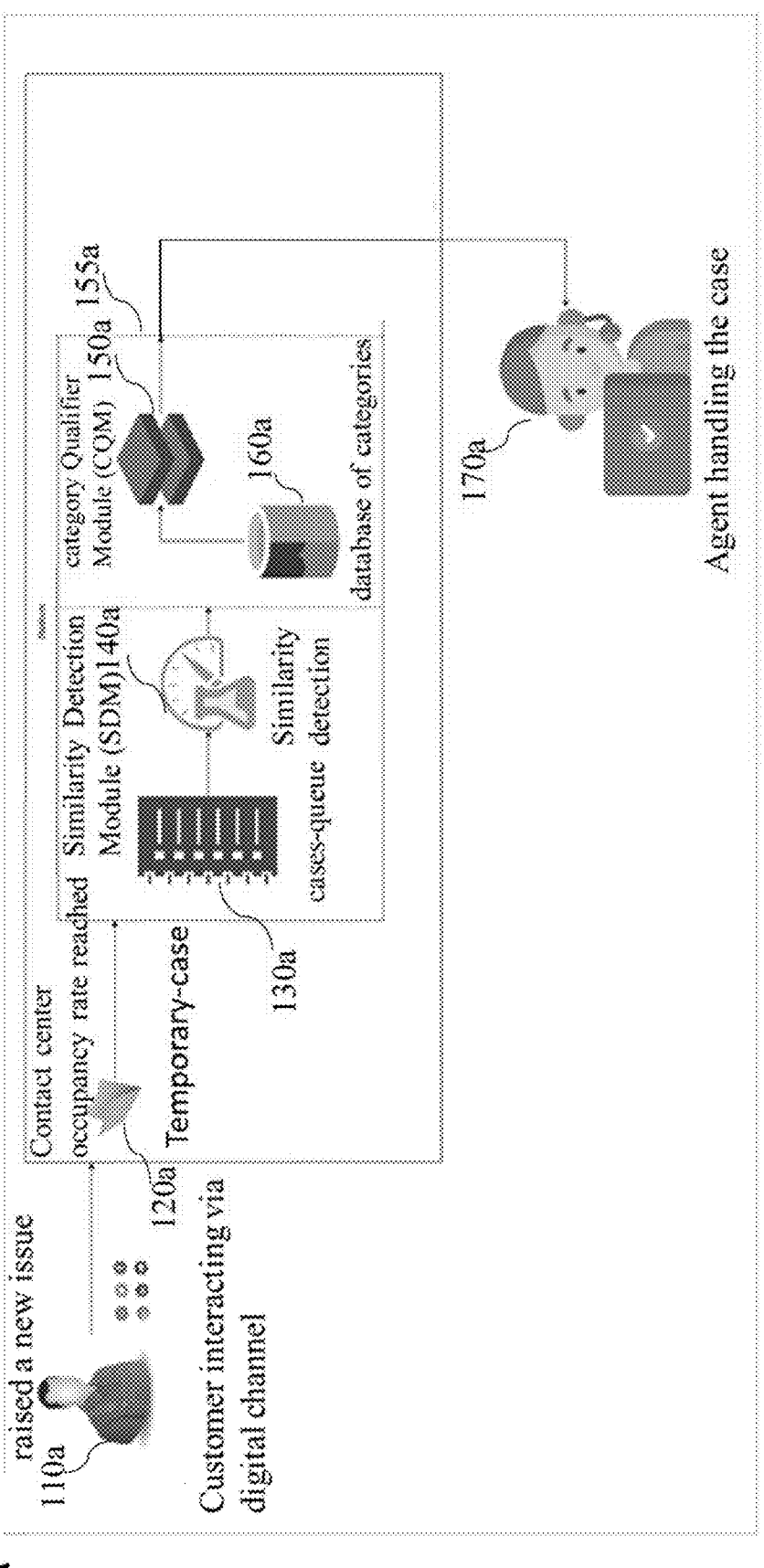
FIGS. 1A-1B schematically illustrate a high-level diagram of a system for providing an identical response to a similar issue that is received from different customers, via inbound-interaction in a digital multi-channel contact center, in accordance with some embodiments of the present disclosure.

FIG. 1A schematically illustrates a high-level diagram of a system 100A for providing an identical response to a similar issue that is received from different customers, via inbound-interaction in a digital multi-channel contact center, in accordance with some embodiments of the present disclosure.

Figure 2B:
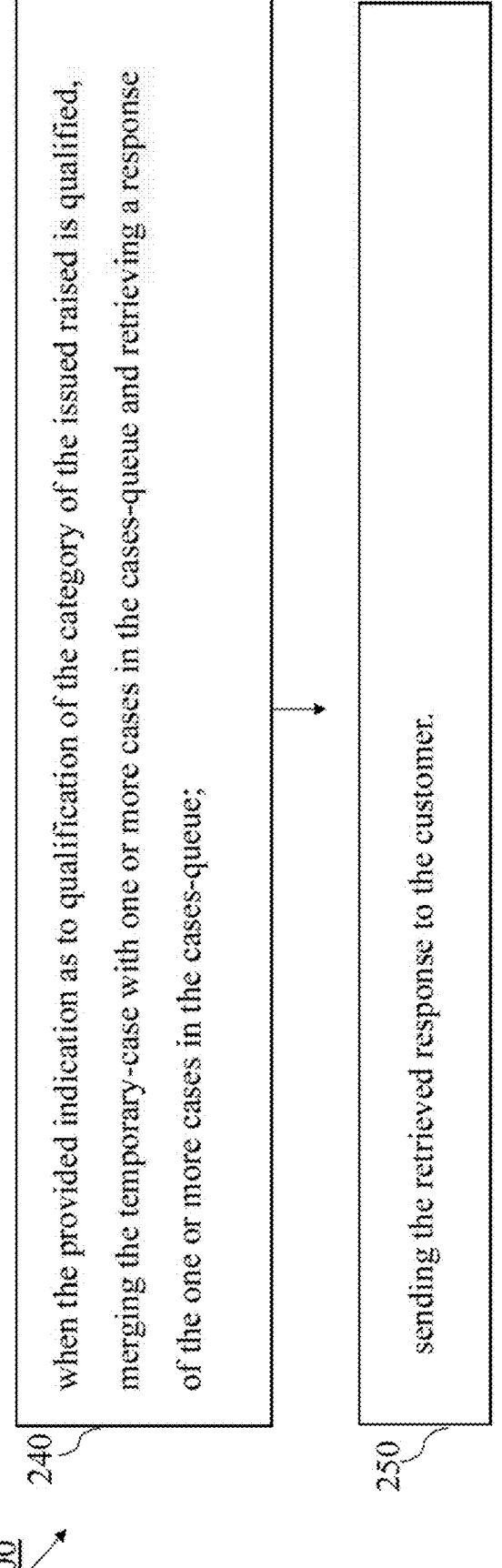

According to some embodiments of the present disclosure, in a system, such as system 100A for providing an identical response to a similar issue that is received from different customers, via inbound-interaction in a digital multi-channel contact center, a method, such as computer-implemented method 200 in FIGS. 2A-2B for providing an identical response to a similar issue that is received from different customers, via inbound-interaction in a digital multi-channel contact center may be implemented.

According to some embodiments of the present disclosure, a customer 110a may interact via a digital channel to raise an issue. The digital channel may be for example, Twitter®, Facebook® and the like.

According to some embodiments of the present disclosure, after this new issue has been received and entered into a queue of interactions (not shown), the contact center occupancy rate, which is the ratio of agents occupied during a shift from the total agents assigned to it, may be checked. When the contact center occupancy rate is above a first preconfigured threshold then for this queued issue, e.g., for each inbound-interaction from a customer that is entering an interactions-queue creating a temporary case 120a. The temporary-case is to keep track of the issues before filtering and qualifying category. When a queued issue doesn't have a qualified then generating a new case without merging the queued issue with an existing one.

According to some embodiments of the present disclosure, operating a Similarity Detection Module (SDM) 140a on the created temporary-case 120a and one or more cases in a cases-queue 130a to receive a similarity-score for the created temporary-case. The SDM module may check the temporary-case 120a against the cases in the cases-queue 130a by using Natural Language Processing (NLP) model where if the similarity score is above a preconfigured similarity threshold value, that means this temporary-case 120a belongs to a previously created case and is qualified for a related stored response.

According to some embodiments of the present disclosure, the operating of the SDM module 140a may include using a Natural Language Processing (NLP) model to calculate the similarity score of the temporary-case by comparing one or more keywords in the issue raised in the inbound-interaction to one or more keywords in an issue raised in each case of the one or more cases stored in the case-queue. The SDM module 140a may use the NLP model to compare the temporary-case 120a against all the cases in the cases-queue 140a. The comparison may include the whole content, e.g., words, in the temporary-case 120a and then calculating the similarity score along with the similarity keyword for each case in the cases-queue 130a. Then, the case that has the highest similarity score that is greater than a second preconfigured score may be identified as the similar case out of all the cases present in the cases-queue 130a.

According to some embodiments of the present disclosure, when the similarity score is above the preconfigured similarity threshold value, e.g., a second preconfigured threshold, which means that there is a similar case that has already been handled and a response has been provided to the related customer, then a category may be checked. The response may be presented via a display unit associated to a computerized-device of the customer.

According to some embodiments of the present disclosure, the category may be checked by a Category Qualifier Module (COM) 150a, to find if the category of the issue raised in the temporary-case 120a is among the preconfigured categories stored in a database, such as database of categories 160a. When the category exists in the database of categories 160a, then the COM 150a may provide an indication as to qualification of the category of the issue raised. The indication may be qualified or not-qualified. The indication of qualified means that when there is a standard response to a similar case the standard response may be provided to the raised issue in the temporary-case 120a. The indication of qualified temporary-case means that the temporary-case belongs to one of the preconfigured categories and it may be forwarded to a supervisor for a standard response or automatically may be provided a standard response via an agent. The agent may send the standard response to a computerized-device of the customer to be presented via a display unit associated to the computerized-device.

According to some embodiments of the present disclosure, a category may be created and stored in the database of categories 160a when there is more than one similar case in the case-queue 130a. For each cluster of cases having a similarity score above a second preconfigured threshold, a category may be created and stored in the database of categories 160a. For example, when the frequency of an issue reported for a topic is more than a preconfigured number of times, e.g., x times, during a preconfigured period, e.g., y minutes and if that category is not already stored in the database of categories, then a new category may be added to the database of categories 160a.

According to some embodiments of the present disclosure, optionally, the new category may be added by the supervisor to ensure similarity detection is applied to the categories that are deemed critical by the supervisor. For example, in a phone company, in case of a new product launch, there may be a higher probability of multiple customer reporting issues related to the new product. So, in that case the supervisor can create categories, such as "new Phone shipment", "new Phone accessories", "new phone software issue".

According to some embodiments of the present disclosure, the operating of the COM module 155a may include checking if the one or more keywords in the issue raised in the inbound-interaction exist in each category of preconfigured categories stored in a database of categories. When the one or more keywords exist in a category in the database of categories 160a, the issue raised in the temporary case 120a may be indicated as qualified, and when the one or more keywords doesn't exist in any category in the database of categories 160a, the issue raised may be indicated as not-qualified.

According to some embodiments of the present disclosure, optionally, once the COM 150a has provided an indication that the issue raised in the temporary-case is qualified, the raised issue may be forwarded to a Supervisor Approval Module (SAM). The supervisor of the contact center may be enabled to approve or reject the merging of cases and provide a standard response. This standard response can then be reused again in the future as a response when the same kind of issue is raised. The supervisor has an option after merging the case, either to directly send the standard response or to assign this case to an agent who can use the standard response.

According to some embodiments of the present disclosure, optionally, when the temporary-case has been determined as qualified, the implemented method, such as computer-implemented method 200 in FIGS. 2A-2B may further include operating a Supervisor Approval Module (SAM) to enable a user to approve the merging of temporary-case with one or more cases and provide a standard response to the customer by the agent or reject it.

According to some embodiments of the present disclosure, the merged case which is assigned to the agent with a previously drafted standard response, may be reused by the agent every time a new case may be found as qualified by the CQM module 155a.

According to some embodiments of the present disclosure, when the provided indication as to qualification of the category of the issued raised, by the COM module 155a is qualified, the temporary-case 120a may be merged with one or more cases in the cases-queue 130a and a response of the one or more cases in the cases-queue 130a may be retrieved and sent to the customer by an agent 170a.

According to some embodiments of the present disclosure, for each inbound-interaction from a customer that is entering an interactions-queue and the contact center occupancy rate is not above the first preconfigured threshold, then, generating a new case to be stored in the cases-queue 130a.

According to some embodiments of the present disclosure, the creating of the temporary-case 120a may include storing information related to the issue raised in the inbound-interaction. The information includes at least one of: (i) customer details; (ii) location; and (iii) time stamp.

According to some embodiments of the present disclosure, after merging the temporary-case 120a with one or more cases in the cases-queue 130a, the temporary-case 120a may be assigned to an agent and sending the retrieved response to the agent.

Figure 6A:
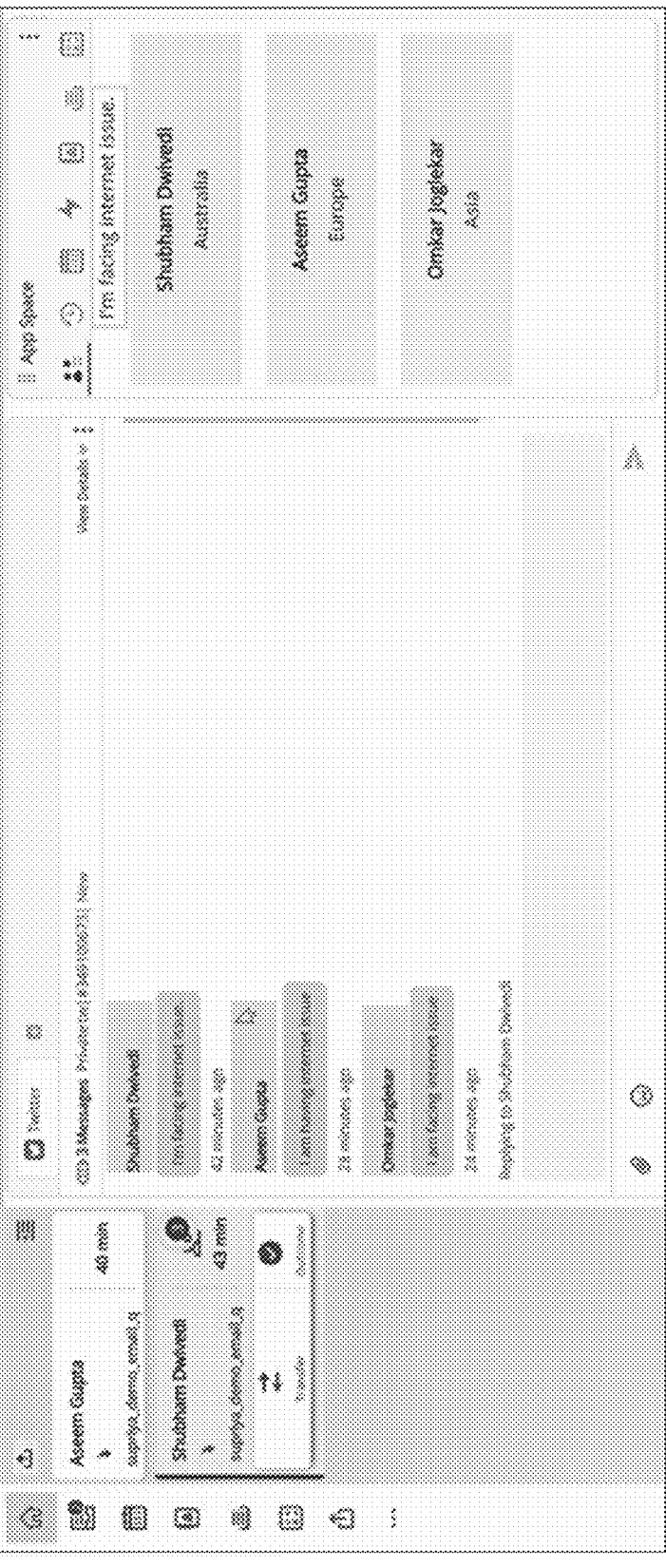
FIGS. 6A-6C are examples of screenshots of User Interface (UI), in accordance with some embodiments of the present disclosure.
Figure 6B:
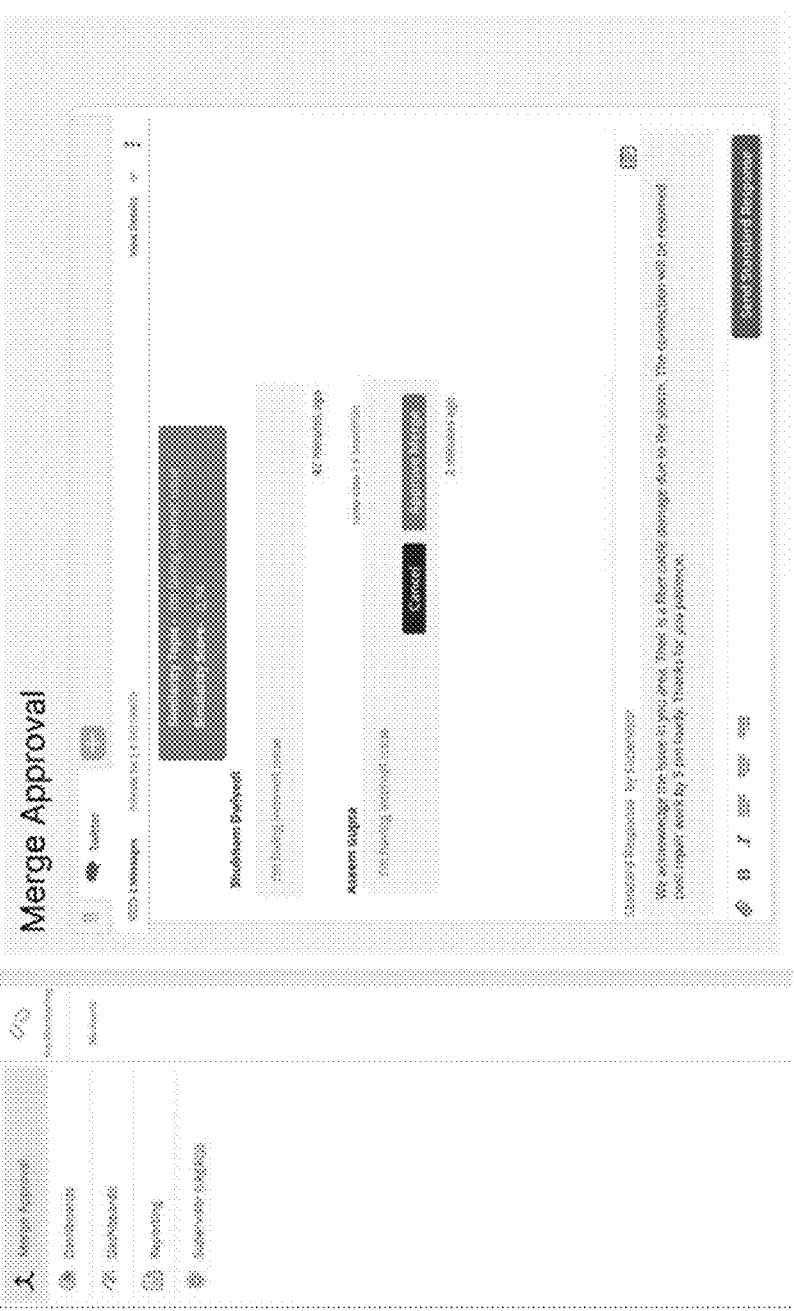
Figure 6B:
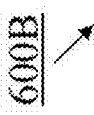
Figure 6C:
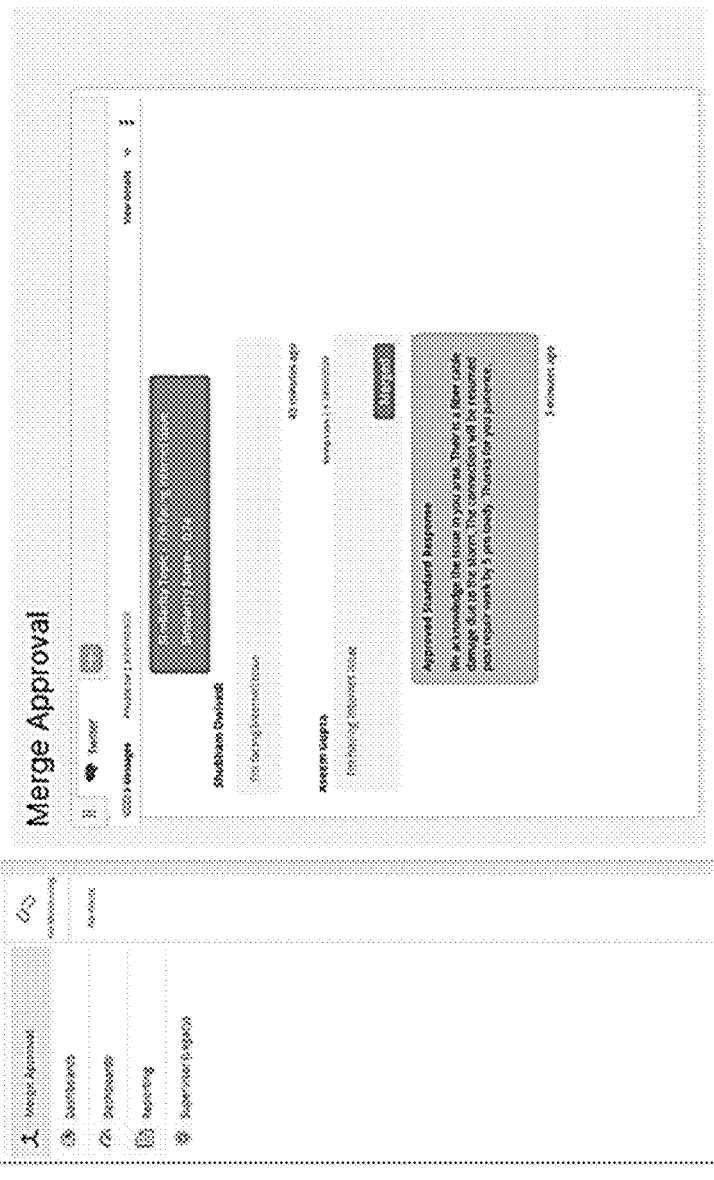

According to some embodiments of the present disclosure, optionally, the retrieved response of the one or more cases in the cases-queue 130a may have been entered by a user, such as a supervisor, as shown in FIGS. 6A-6C.

According to some embodiments of the present disclosure, when the received similarity-score is not above a second preconfigured threshold a new-case may be created.

Figure 1B:
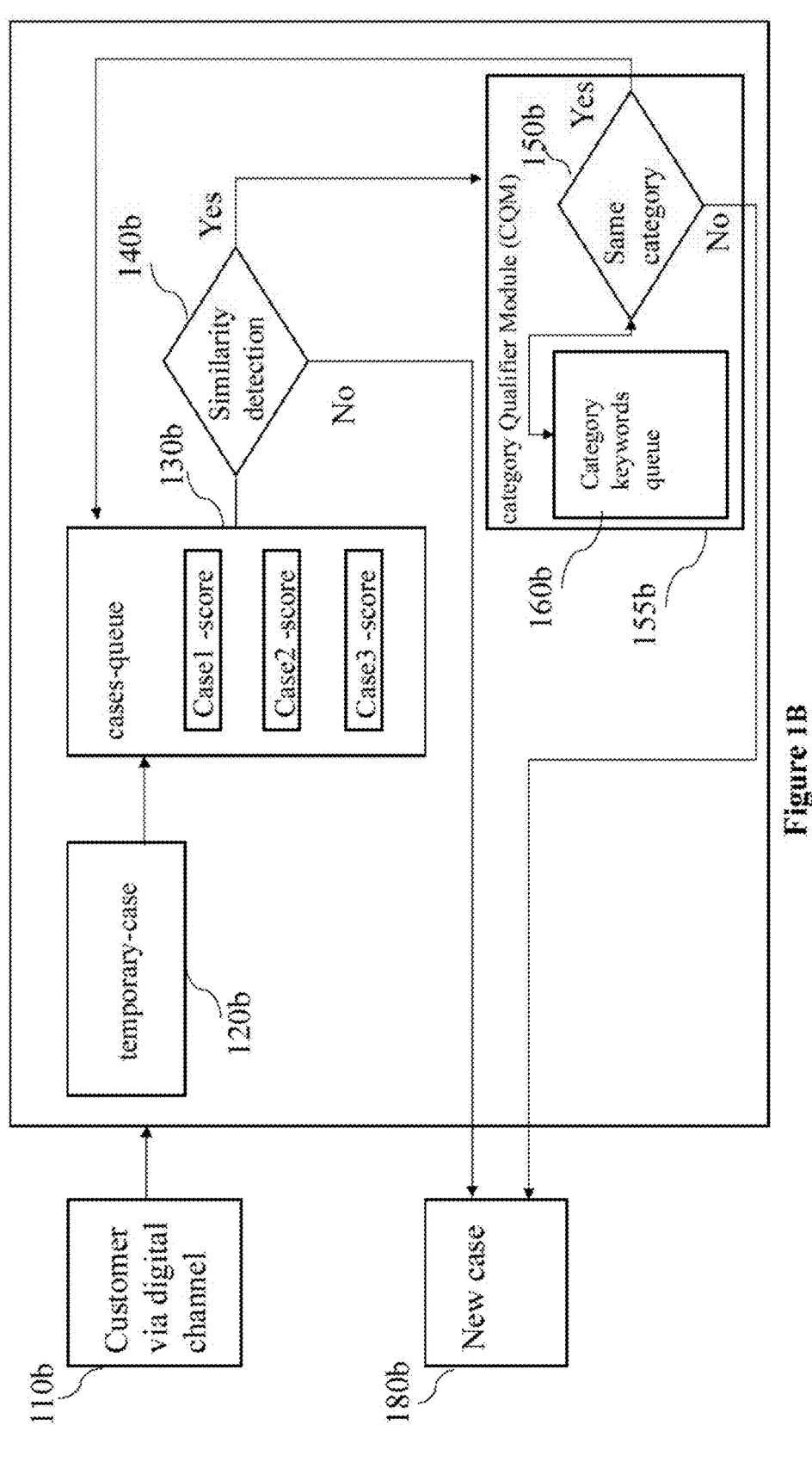

FIG. 1B schematically illustrates a high-level diagram of a system 100B for providing an identical response to a similar issue that is received from different customers, via inbound-interaction in a digital multi-channel contact center, in accordance with some embodiments of the present disclosure.

According to some embodiments of the present disclosure, system 100B may include all the component of system 100A and may implement a method, such as computer-implemented method 200 in FIGS. 2A-2B. For example, the first preconfigured threshold of the contact center occupancy rate may be configured as 80%, which means that 80% of contact center bandwidth has been reached. The second preconfigured threshold for the similarity-score which has been received from a module, such as the SDM 140a in FIG. 1A, may be configured to be '0.7' on the scale of '0' to '1'.

According to some embodiments of the present disclosure, when a new line or version of phone may be launched, and these new phones have a similar software bug which is common for millions of customers and customers started raising issues for the same via different digital channels 110b, such as Twitter®, Facebook®, Instagram® and the like, then millions of queries are coming into the contact center for similar or non-similar issues.

According to some embodiments of the present disclosure, for example, when the new line of launched phone has one main issue to be resolved and the occupancy rate in the contact center has crossed the first preconfigured threshold, e.g., 80%, then, each incoming interaction of a customer via a digital channel 110b may have a temporary-case 120b created.

According to some embodiments of the present disclosure, the issue raised in the interaction which a temporary-case 120b may have been created for may be checked for similarity detection 140b by a module, such as SDM 140a in FIG. 1A. The similarity check may include using a Natural Language Processing (NLP) model against the already created cases which are stored in the cases-queue 130b to calculate the similarity score of the temporary-case 120b by comparing one or more keywords in the issue raised in the inbound-interaction to one or more keywords in an issue raised in each case of the one or more cases stored in a queue, such as case-queue 130a and such as case-queue 130b in FIG. 1B.

According to some embodiments of the present disclosure, after the temporary-case 120b has been created it may be matched against cases in a cases-queue 130b. The matching may be operated by a module, such as SDM which may use the NLP model which may provide a Required Minimum Similarity Score ($S_{min}$), e.g., $S_{mm}$ is '0.7'. Preconfiguring the $S_{mm}$ to '0.7' may indicate that the minimum contextual match of the issue raised should have a minimum 70% similarity score to a case in the cases-queue 130b for the similarity detection 140b. If the $S_{min}$>='0.7' then it may indicate that the similarity is matched and the temporary-case 120b may be qualified for a check by the COM 155b to find the same category in the category keywords queue 160b.

According to some embodiments of the present disclosure, when the detected similarity score of a case in the cases-queue 130b is above the second preconfigured threshold, e.g., '0.7', then, a module, such as COM 155b and such as COM 155a in FIG. 1A may be operated to check same category 150b. The COM 155b, which is a category qualifier may be operated to check if the issue raised and a temporary-case 120b has been created for matches any preconfigured category, i.e., one or more keywords of the category as stored in a database, such as database 160a in FIG. 1A.

According to some embodiments of the present disclosure, the COM 155b may check if the issue raised is among the preconfigured categories present in the categories database. For example, when one of the categories in the categories database may be 'Software issue' and the issue raised based on the similarity scores e.g., there is one case in the cases-queue 130b that has similarity score above a preconfigured threshold and there are one or more keyword keywords in the category keywords queue 160b, e.g., categories database 160a in FIG. 1A, that matched 'Software issue' category then that means it may be qualified by the COM 155b.

According to some embodiments of the present disclosure, optionally, when the COM provides an indication that the temporary-case 120b qualifies, then the issue raised may be routed to a module such as Supervisor Approval Module (SAM) (not shown). The SAM may be operated to enable a user, such as supervisor to decide if to merge this temporary-case 120b with an existing case that has been found in a similar category in a categories database, by the CQM 155b and to draft a standard response which can be sent out as a response and then these merged cases to be continued to be handled by the assigned agent. The existing case may be found by operating the COM 155b According to some embodiments of the present disclosure, the SAM may enable the supervisor to approve or reject the merging of cases and provide the standard response directly to the customer of the temporary-case 120b or to the agent to be sent to the customer. This standard response is like pre-draft quick response which may be provided in future inbound-interactions.

According to some embodiments of the present disclosure, once the temporary-case 120b is merged and assigned to the agent, then the agent can use the pre-drafted standard response by the supervisor or an existing response. This standard response can be reused every time a case in an inbound interaction may be qualified by all the modules, e.g., SDM 140a in FIG. 1A and CQM 155a in FIG. 1A.

According to some embodiments of the present disclosure, when the CQM 155b may not find one or more keywords in a category in the categories database which are similar to one or more words in the issue raised and a temporary-case 120b may have been created then a new case may be generated. When there is no indication as to qualification of a category of the issue raised, then it means that the temporary-case 120a then there is no category in the database of categories 160a. A category in the database of categories 160a may be created when there is more the one similar case in the cases-queue which are clustered, and a standard response may be provided to the customer for example, by the agent or by the supervisor.

FIGS. 2A-2B are a high-level workflow of a computer-implemented method 200 for providing an identical response to a similar issue that is received from different customers, via inbound-interaction in a digital multi-channel contact center, in accordance with some embodiments of the present disclosure.

According to some embodiments of the present disclosure, operation 210 comprising creating a temporary-case for an issue raised in the inbound-interaction.

According to some embodiments of the present disclosure, operation 220 comprising operating a Similarity Detection Module (SDM) on the created temporary-case and one or more cases in a cases-queue to receive a similarity-score for the created temporary-case.

According to some embodiments of the present disclosure, operation 230 comprising operating a Similarity Detection Module (SDM) on the created temporary-case and one or more cases in a cases-queue to receive a similarity-score for the created temporary-case.

According to some embodiments of the present disclosure, operation 240 comprising when the provided indication as to qualification of the category of the issued raised is qualified, merging the temporary-case with one or more cases in the cases-queue and retrieving a response of the one or more cases in the cases-queue.

According to some embodiments of the present disclosure, operation 250 comprising sending the retrieved response to the customer.

Figure 3:
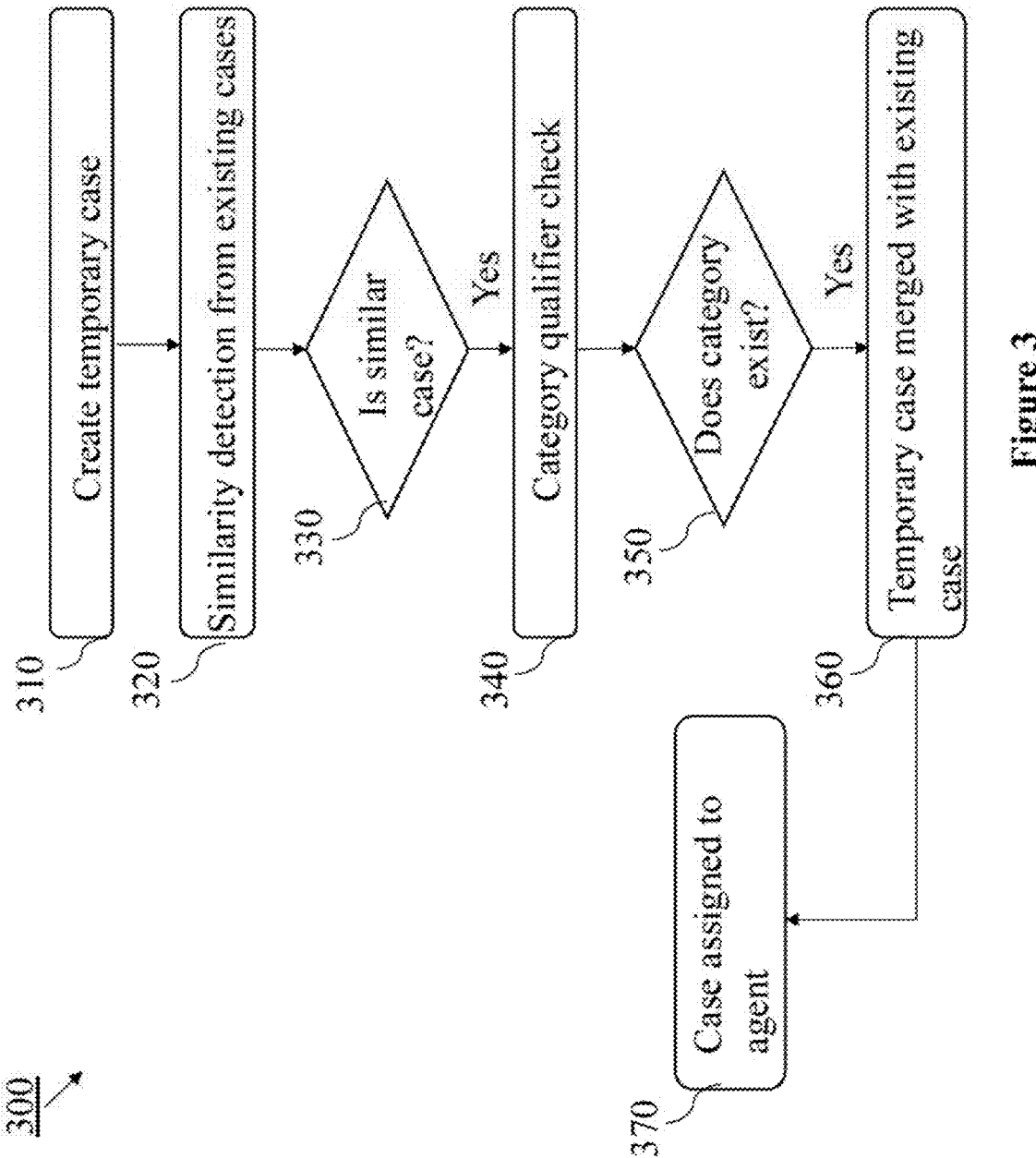
FIG. 3 is a high-level workflow of a method for providing an identical response to a similar issue that is received from different customers, via inbound-interaction in a digital multi-channel contact center, in accordance with some embodiments of the present disclosure.

FIG. 3 is a high-level workflow of a method 300 for providing an identical response to a similar issue that is received from different customers, via inbound-interaction in a digital multi-channel contact center, in accordance with some embodiments of the present disclosure.

According to some embodiments of the present disclosure, in a system, such as system 100A and such as system 100B, an issue may be raised by a customer via a digital channel. When the contact center occupancy rate is above a first preconfigured threshold, then create temporary case 310, such as temporary case 120a in FIG. 1A and such as temporary-case 120b in FIG. 1B.

According to some embodiments of the present disclosure, operating a similarity detection of existing cases which are stored in a queue, such as cases-queue 130a by a module, such as SDM 140a in FIG. 140a. The SDM may provide a similarity score of the issue raised to cases in the cases-queue. Each case in the cases-queue may be attributed a score which indicates the similarity level of the issue raised to the case. When there is a case in the cases-queue that the similarity score of the temporary-case to it. E.g., is similar case? 330, is above the first preconfigured threshold then operating a category qualifier check 340.

According to some embodiments of the present disclosure, to check does category exit 350 a module, such as COM 155a in FIG. 1A may be operated to provide an indication as to qualification of a category of the issue raised.

According to some embodiments of the present disclosure, the temporary-case may be merged with existing case 360 or one or more cases in the cases-queue, i.e., similar cases, if the COM has provided an indication that the temporary-case is qualified.

According to some embodiments of the present disclosure, optionally, a user may be enabled to either send a standard response for all the merged cases, e.g., one or more cases or create a standard response and then assign the case to the agent 370 with the standard response.

FIG. 4 is a table of test simulation 400, in accordance with some embodiments of the present disclosure.

According to some embodiments of the present disclosure, the table of test simulation 400 shows effectiveness of an implementation of a method, such as computer-implemented method 200 in FIG. 2A-2B in a system, such as system 100A and such as system 100B. The following variables and constants may be considered for queries 1-11. $X_{total}$ is the total number of cases in the queue, such as cases-queue 130a in FIG. 1A in the contact center, $C_n$ is a number of categories. A is the total number of agents in the contact center, Effective KPI of an agent ($A_{KP0}$ is the ability of an agent to handle the number of cases at a time, T is a first preconfigured threshold for the occupancy rate of the contact center, $S_Y$ is a number of similar cases, which is a preconfigured percentage of $X_{total}$.

According to some embodiments of the present disclosure, to determine the effectiveness of the method, such as computer-implemented method 200 in FIG. 2A-2B for providing an identical response to a similar issue that is received from different customers, via inbound-interaction in a digital multi-channel contact center, the pending cases, e.g., interactions in the interactions-queue may be checked without the implementation of the method and it is represented as $PC_{before}$ and the pending cases with the implementation of the computer-implemented method 200 in FIGS. 2A-2B which is represented as $PC_{after}$.

According to some embodiments of the present disclosure, $PC_{before}$ may be calculated by the following formula: $PC_{before}=X_{total}-A$. $PC_{after}$ may be calculated by the following formula: $PC_{after}=X_{total}$ $(1-S_Y/100)-A+C_n$. The data structures for all the modules and the final merges case will be as follows. For the Similarity Detection Module (SDM), such as SDM 140a in FIG. 1A, the data structure may comprise the contactCentreThresholdReached value, e.g., first preconfigured threshold, which may be the threshold value based on which the case may be moved to the modules, e.g., SDM and COM. The totalAgents is the number of agents in the contact center, AgentsOnCase means working occupied agents, CaseList may be the list of all the cases, Case WaitingInQueue is the list of waiting issues, e.g., cases-queue 130a in FIG. 1A, currentTempCase is the case object containing information related to the temporary-case, e.g., temporary-case 120a in FIG. 1A. The data structure would be used in the implementation of a system, such as system 100A in FIG. 1A to detect a similar case which already exist in the queue, such as cases-queue 130a and has an indication to a cluster of similar cases as a related category in the database of categories 160a, from creating a temporary-case and then analyzing it by the modules, e.g., SDM 140a in FIG. 1A and CQM 155a in FIG. 1A.

According to some embodiments of the present disclosure, for Category Detection Module, such as COM 155a in FIG. 1A, the data structure may include a categoriesList which is the list of all the categories, such as database of categories 160a in FIG. 1, similarityScoreOfCurrentCase may be the score after similarity detection for the new issue, currentCaseSimilarity, similarCaseId is the Id for the already existing case with which the new issue is matched and currentTempCase is the case object containing information related to the temporary-case.

According to some embodiments of the present disclosure, for the merged cases, the data structure will comprise of caseTempIdsList which is the list of all the merged temp cases, mergedMasterCaseId which is the case Id in which all the similar temp cases will be mapped, standardResponse is the response drafted by the supervisor and caseData will be the combined temp case object which are already merged.

According to some embodiments of the present disclosure, in the test simulations the following variables may be considered: A=100, $A_{KPI}=1$, and $S_Y=80$. For the Test simulation there is a uniform $X_{total}$ and varying $C_n$.

According to some embodiments of the present disclosure, the test simulation results show that for each query the $PC_{before}$ when the computer-implemented method 200 in FIG. 2A-2B for providing an identical response to a similar issue that is received from different customers, via inbound-interaction in a digital multi-channel contact center is not implemented in a system such as system 100A in FIG. 1A, or system 100B in FIG. 1B, is higher than $PC_{after}$, when the computer-implemented method 200 in FIG. 2A-2B for providing an identical response to a similar issue that is received from different customers, via inbound-interaction in a digital multi-channel contact center is implemented in a system, such as system 100A in FIG. 1A or system 100B in FIG. 1B.

Figure 5A:
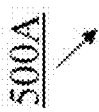
Figure 5A:
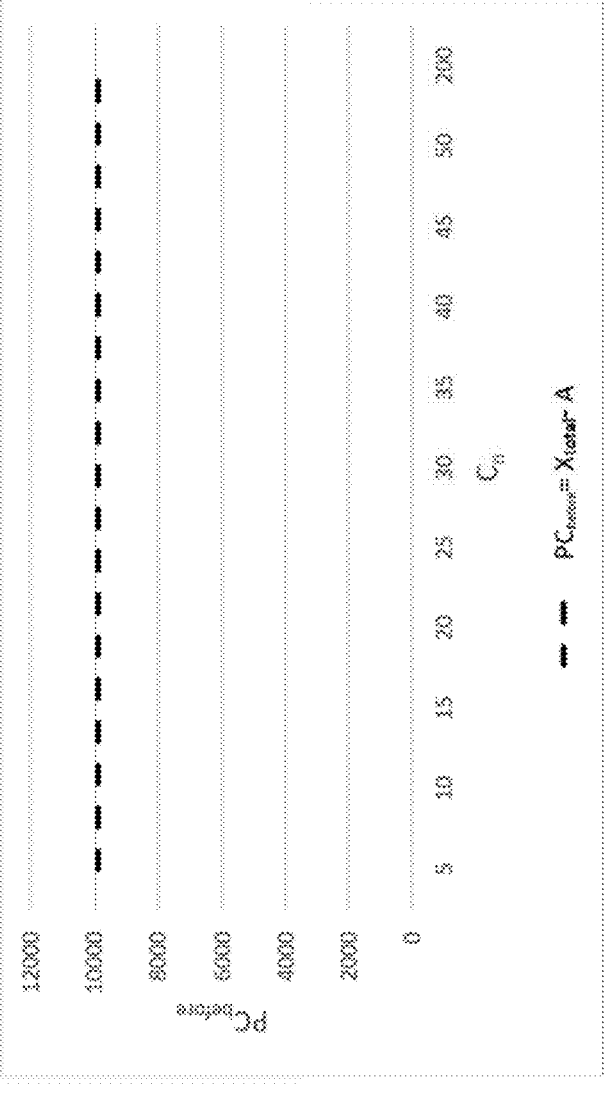
Figure 5B:
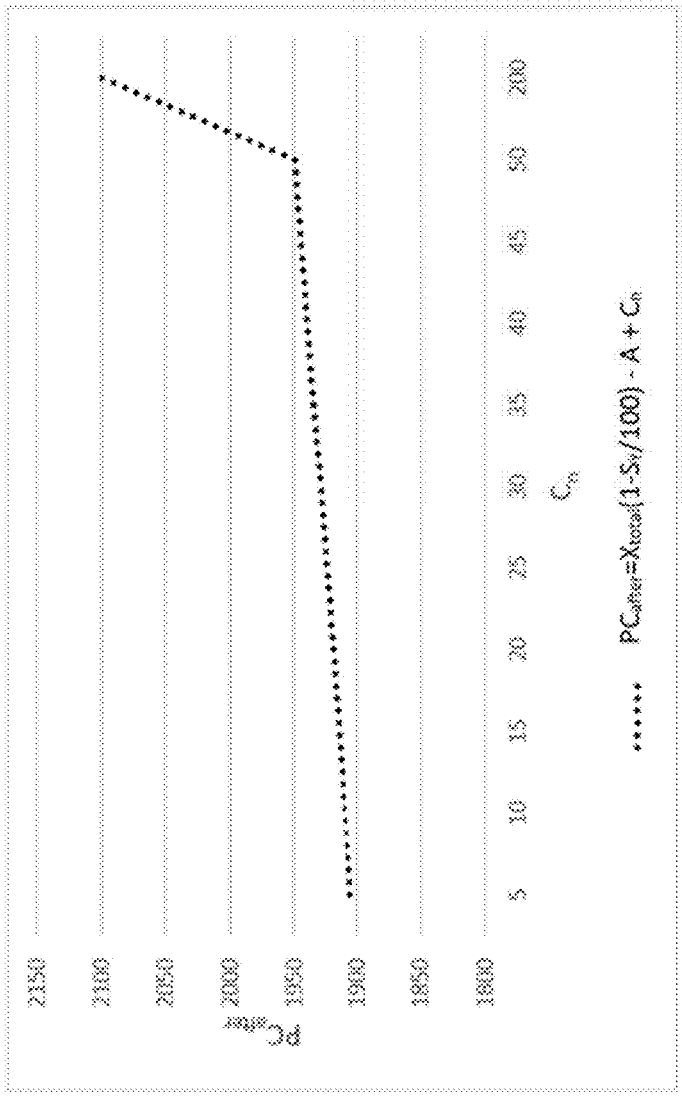
Figure 5B:
Figure 5C:
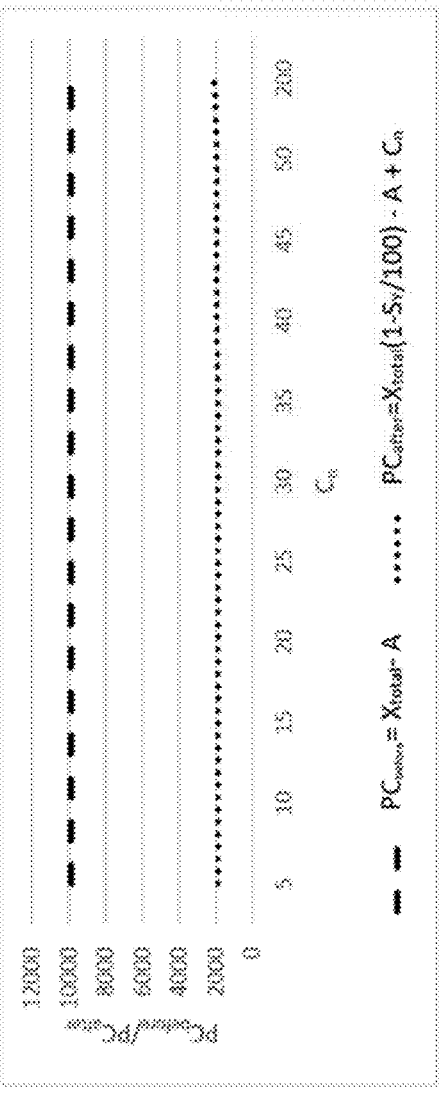
Figure 5C:
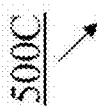

FIGS. 5A-5C shows graph results, in accordance with some embodiments of the present disclosure.

According to some embodiments of the present disclosure, graph 5A, 5B and 5C show the outcome of the table 400 in FIG. 4. For this Test simulation in table 400, there is the uniform $X_{total}$ which is the total number of cases already queued in the contact center and varying Ca which is the number of categories. The graph 5A shows the pending cases, $PC_{before}$ without a system, such as system 100A in FIG. 1A, while graph 500B in FIG. 5B depicts the smaller number of pending cases $PC_{after}$ with the implementation of a system, such as system 100A in FIG. 1A, even when the number of categories, $C_n$ is increasing in each test query. Graph 500C in FIG. 5C, shows a comparison between the before $PC_{before}$ and after $PC_{after}$ pending cases which demonstrates a differences therebetween.

FIG. 5D shows graph results 500D, in accordance with some embodiments of the present disclosure.

According to some embodiments of the present disclosure, graph 500D is a test simulation in which, the varying $X_{total}$ is the total number of cases already queued in the contact center, e.g., in cases-queue 130a in FIG. 1A and uniform Ca is the number of categories in a database, such as database of categories 160a in FIG. 1A.

Figure 5E:
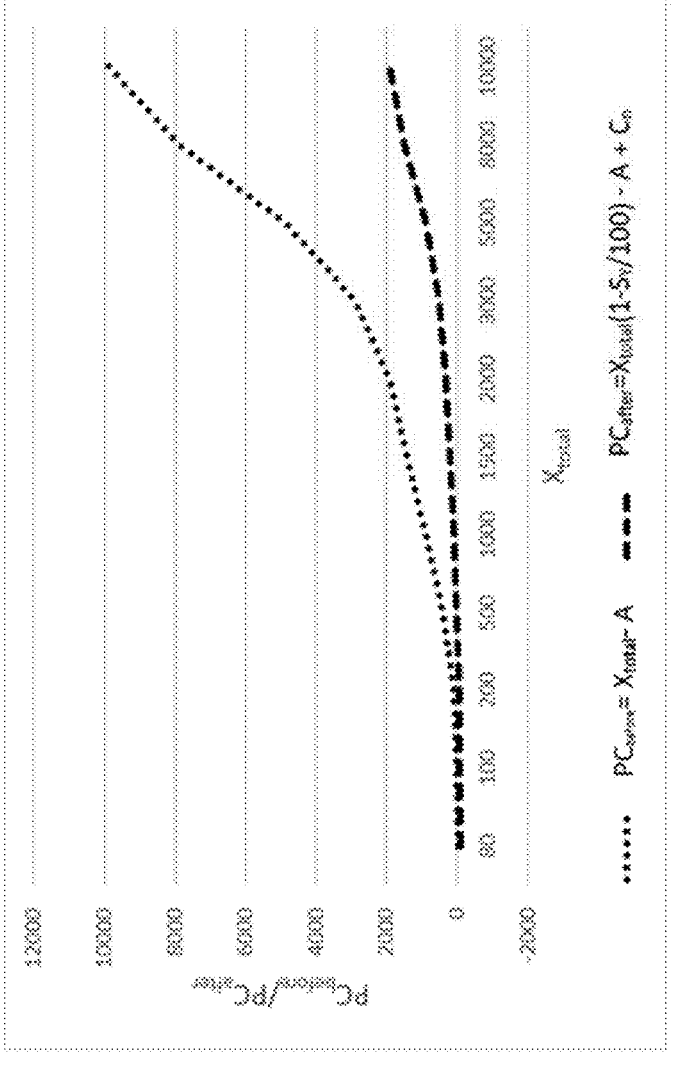
Figure 5E:
Figure 5F:
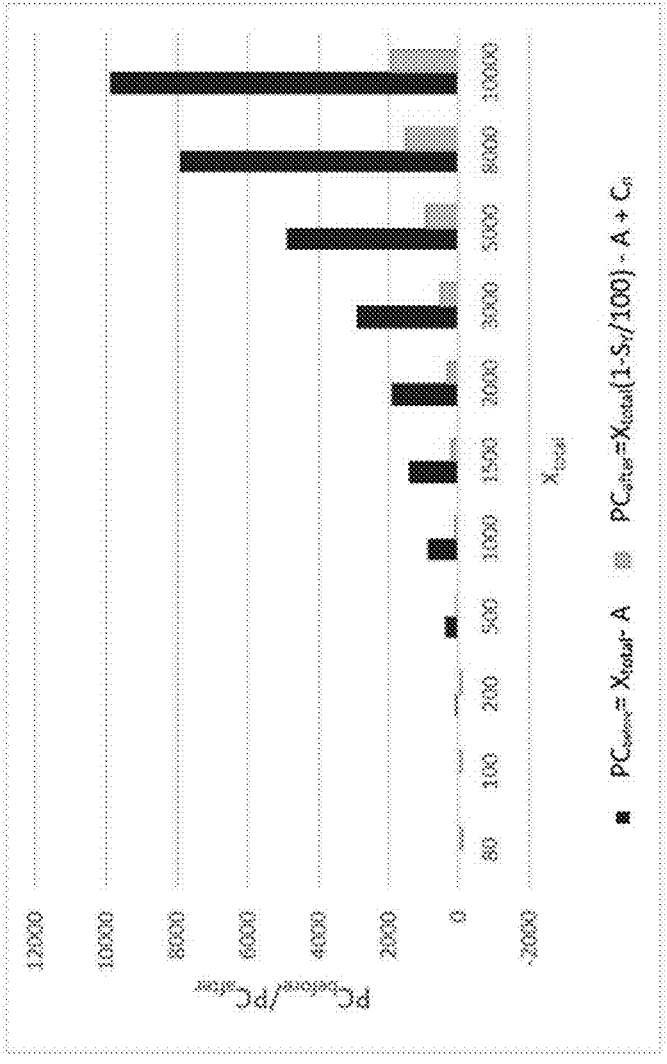
Figure 5F:

FIGS. 5E-5F show graph results, in accordance with some embodiments of the present disclosure.

According to some embodiments of the present disclosure, graphs in FIGS. 5E and 5F show the outcome of table 500D in FIG. 5D. in which the varying $X_{total}$ is the total number of cases already queued in the contact center, e.g., in a queue, such as cases-queue 130a in FIG. 1A and uniform $C_n$ is the number of categories, e.g., categories in a database, such as database of categories 160a in FIG. 1A. The graphs in FIGS. 5E and 5F showcase the smaller number of pending cases, $PC_{after}$, even when the number of cases $X_{total}$ is continuously increasing in a system, such as system 100A in FIG. 1A, whereas the pending cases before, $PC_{before}$ show a huge spike when the number of queued cases, $X_{total}$ started increasing. A difference may be seen between the $PC_{before}$ and $PC_{after}$ curves in the graph which also shows the effectiveness a system, such as system 100A in FIG. 1A and such as system 1B in FIG. 1B.

FIG. 6A is an examples of a screenshot of a User Interface (UI) 600A, in accordance with some embodiments of the present disclosure.

According to some embodiments of the present disclosure, UI 600A shows an example of three inbound-interactions which raise the same issue of internet issue. In a system, such as system 100A in FIG. 1A and such as system 100B in FIG. 1B, when the contact center occupancy rate is above a first preconfigured threshold, a method, such as computer-implemented method 200 in FIGS. 2A-2B for providing an identical response to a similar issue that is received from different customers, via inbound-interaction in a digital multi-channel contact center may be implemented and the three cases may be merged into one case and may be provided with an identical response.

FIG. 6B is an example of screenshot of UI 600B, in accordance with some embodiments of the present disclosure.

According to some embodiments of the present disclosure, UI 600B shows an example of three inbound-interactions which raise the same issue of internet issue. In a system, such as system 100A in FIG. 1A and such as system 100B in FIG. 1B, when the contact center occupancy rate is above a first preconfigured threshold, a method, such as computer-implemented method 200 in FIGS. 2A-2B for providing an identical response to a similar issue that is received from different customers, via inbound-interaction in a digital multi-channel contact center may be implemented and the two cases receive a similarity score that is 0.74 which is higher than the first preconfigured threshold based on the issue raised "I'm facing internet issue" and an existing case that is stored in a queue, such as cases-queue 130a in FIG. 1A and an indication as to qualification of the category of the issue raised, which may be stored in a database, such as database of categories 160a in FIG. 1A, and such as database of categories 160b in FIG. 1B. A user, such as a supervisor may approve merge of the two cases to an existing case and send an identical response, e.g., standard response to the two cases.

FIG. 6C is an example of screenshot of UI, in accordance with some embodiments of the present disclosure.

According to some embodiments of the present disclosure, UI 600B shows a standard response sent to two cases which have been approved by a supervisor for merge, as shown in UI 600B in FIG. 6B.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computer-implemented method for providing an identical response to a similar issue that is received from different customers, via inbound-interaction in a digital multi-channel contact center, said computer-implemented method comprising:

for each inbound-interaction from a customer that is entering an interactions-queue and a contact center occupancy rate is above a first preconfigured threshold:

(i) creating a temporary-case for an issue raised in the inbound-interaction;

(ii) operating a Similarity Detection Module (SDM) on the created temporary-case and one or more cases in a cases-queue to receive a similarity-score for the created temporary-case;

(iii) when the received similarity-score is above a second preconfigured threshold, operating a category Qualifier Module (CQM) on the temporary-case to provide an indication as to qualification of a category of the issue raised;

(iv) when the provided indication as to qualification of the category of the issue raised is qualified, merging the temporary-case with one or more cases in the cases-queue, wherein for the merged cases a data structure comprises a mergedMasterCaseId which is a case Id in which all similar temp cases will be mapped and caseData which is a combined temp case object, which are already merged, and retrieving a response of the one or more cases in the cases-queue; and (v) sending the retrieved response to the customer and assigning the temporary-case to an agent and sending the retrieved response to the agent.

2. The computer-implemented method of claim 1, wherein for each inbound-interaction from a customer that is entering an interactions-queue and the contact center occupancy rate is not above the first preconfigured threshold generating a case.

3. The computer-implemented method of claim 1, wherein the creating of the temporary-case comprising:

storing information related to the issue raised in the inbound-interaction, wherein the information includes at least one of: (i) customer details; (ii) location; and (iii) time stamp.

4. The computer-implemented method of claim 1, wherein the operating of the SDM comprising:

using a Natural Language Processing (NLP) model to calculate the similarity score of the temporary-case by comparing one or more keywords in the issue raised in the inbound-interaction to one or more keywords in an issue raised in each case of the one or more cases stored in the case-queue.

5. The computer-implemented method of claim 4, wherein the operating of the CQM comprising:

checking if the one or more keywords in the issue raised in the inbound-interaction exist in each category of preconfigured categories stored in a database of categories, wherein, when the one or more keywords exist in a category in the database of categories, the issue raised is indicated as qualified, and when the one or more keywords doesn't exist in any category in the database of categories, the issue raised is indicated as not-qualified.

6. The computer-implemented method of claim 1, wherein when the temporary-case is determined as qualified, the computer-implemented method further comprising operating a Supervisor Approval Module (SAM) to enable a user to approve or reject the merging of temporary-case with one or more cases.

7. The computer-implemented method of claim 1, wherein the retrieved response of the one or more cases in the cases-queue has been entered by a user.

8. The computer-implemented method of claim 1, wherein when the received similarity-score is not above a second preconfigured threshold a new-case is created.

9. A computerized-system for providing an identical response to a similar issue that is received from different customers, via inbound-interaction in a digital multi-channel contact center, said computerized-system comprising:

one or more processors;

a cases-queue; and a memory to store the cases-queue, for each inbound-interaction from a customer that is entering an interactions-queue and a contact center occupancy rate is above a first preconfigured threshold said one or more processors are configured to:

(i) create a temporary-case for an issue raised in the inbound-interaction;

(ii) operate a Similarity Detection Module (SDM) on the created temporary-case and one or more cases in a cases-queue to receive a similarity-score for the created temporary-case;

(iii) when the received similarity-score is above a second preconfigured threshold, operate a category Qualifier Module (CQM) on the temporary-case to provide an indication as to qualification of a category of the issue raised;

(iv) when the provided indication as to qualification of the category of the issue raised is qualified, merge the temporary-case with one or more cases in the cases-queue, wherein for the merged cases a data structure comprises a mergedMasterCaseId which is a case Id in which all similar temp cases will be mapped and caseData which is a combined temp case object, which are already merged, and retrieving a response of the one or more cases in the cases-queue; and (v) send the retrieved response to the customer and assign the temporary-case to an agent and send the retrieved response to the agent.

* * * * *